(12) United States Patent
Winker

(10) Patent No.: US 7,326,017 B2
(45) Date of Patent: Feb. 5, 2008

(54) FASTENING ELEMENT, WASHER AND FASTENING MEANS THEREFROM

(75) Inventor: Alexander Winker, Spaichingen (DE)

(73) Assignee: Metallwarenfabrik Hermann Winker GmbH & Co.KG, Spaichingen (DE)

( * ) Notice: Subject to any disclaimer, the term of this patent is extended or adjusted under 35 U.S.C. 154(b) by 0 days.

(21) Appl. No.: 11/083,355

(22) Filed: Mar. 17, 2005

(65) Prior Publication Data
US 2005/0220567 A1    Oct. 6, 2005

Related U.S. Application Data

(60) Provisional application No. 60/591,676, filed on Jul. 28, 2004.

(30) Foreign Application Priority Data
Mar. 17, 2004   (DE)   ...................... 10 2004 013 372

(51) Int. Cl.
*F16B 43/00* (2006.01)
(52) U.S. Cl. .................................................... 411/533
(58) Field of Classification Search ................ 411/533, 411/432, 156, 999
See application file for complete search history.

(56) References Cited

U.S. PATENT DOCUMENTS

| 2,225,654 | A |   | 12/1940 | Olson |   |
|---|---|---|---|---|---|
| 2,631,633 | A |   | 3/1953 | Peckham |   |
| 3,304,562 | A |   | 2/1967 | Schmidt |   |
| 3,342,235 | A | * | 9/1967 | Pylypyshyn | ................ 411/134 |
| 4,645,393 | A | * | 2/1987 | Pletcher | ....................... 411/84 |
| 5,827,025 | A | * | 10/1998 | Henriksen | ...................... 411/11 |
| 5,842,894 | A | * | 12/1998 | Mehlberg | ................... 439/801 |
| 6,095,733 | A | * | 8/2000 | Busby et al. | ................. 411/10 |
| 6,554,555 | B2 | * | 4/2003 | Imahigashi | ................ 411/533 |

FOREIGN PATENT DOCUMENTS

| GB | 01315 A | 2/1901 |
|---|---|---|
| GB | 272 807 A | 6/1927 |

* cited by examiner

*Primary Examiner*—Flemming Saether
(74) *Attorney, Agent, or Firm*—Kriegsman & Kriegsman

(57) ABSTRACT

The present invention relates to a fastening means (10; 110) consisting of a fastening element (11; 111) and a washer (20; 120), the washer (20; 120) being held on the fastening element (11; 111) in a rotatable and captive manner. Furthermore, the subject matter of the invention is such a fastening element (11; 111) which has at one end a bearing surface (14) for a washer (20; 120) held on the fastening element (11; 111) in a rotatable and captive manner and has an encircling undercut (13; 113) at the end facing its bearing surface (14). Finally, the subject matter of the invention is a washer (20; 120) having a contact surface (21) for the bearing surface (14) of a fastening element (11; 111), at least two axially extending retaining tabs (23; 123) being formed on the contact surface (21). The retaining tabs (23; 123) engage in the undercut (13; 113).

9 Claims, 2 Drawing Sheets

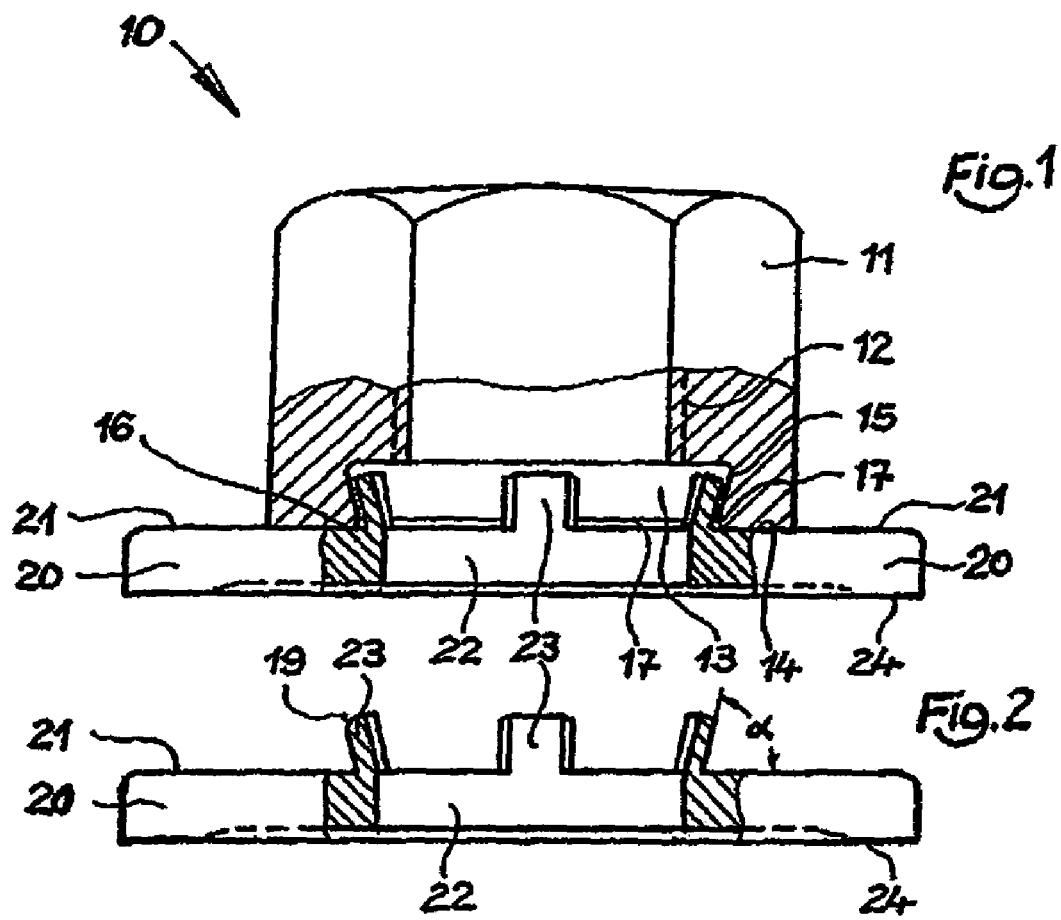
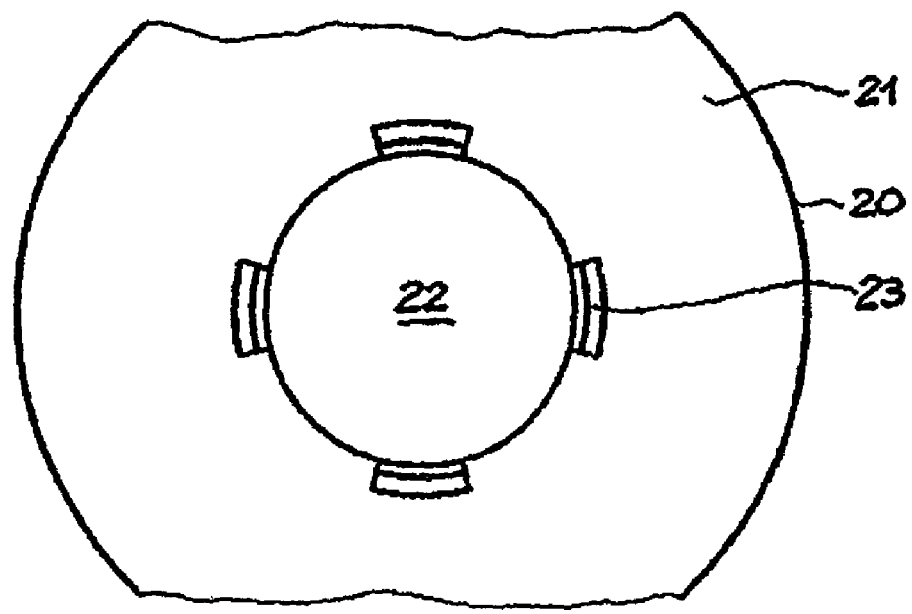

FASTENING ELEMENT, WASHER AND FASTENING MEANS THEREFROM

CROSS-REFERENCE TO RELATED APPLICATIONS

The present application claims the benefit under 35 U.S.C. 119(e) of U.S. Provisional Patent Application No. 60/59 1,676, filed Jul. 28, 2004, the disclosure of which is incorporated herein by reference.

BACKGROUND OF THE INVENTION

The present invention relates to a fastening element, in particular a nut body, which has at one end a bearing surface for a washer held on the fastening element in a rotatable and captive manner. The present invention also relates to a washer having a contact surface for the bearing surface of a fastening element and to a fastening means which is formed from a fastening element and a washer.

A washer of the generic type has been disclosed by EP 1 091 135 A2. This washer has a washer body having at least two integrally formed retaining claws which can be folded around an encircling flange provided on the fastening element. In this way, the washer is held on the fastening element in a captive manner. German Utility Model DE 94 00 671 U1 describes a washer which, instead of retaining claws, has an annular web running around the washer body.

In the known embodiments of nut bodies having an encircling flange for holding the washer, the radial extent of the washer is limited. The outside diameter of the washer cannot be substantially greater than the diameter of the encircling flange. Otherwise, indentations would have to be made on the washer for producing the retaining claws, which on the one hand is expensive from the production point of view and on the other hand leads to instability of the washer. In addition, the thickness of the washer is also limited. The washer thickness must still allow the bending of the retaining claws or of the annular web around the flange.

Another possibility is to integrally form a retaining collar on the inner margin of the bearing surface of the fastening means, this retaining collar being beaded on the outside and thus holding a step in the washer. This configuration is described, for example, in DE 101 36 829 C1. In this case, however, in a hexagon nut, only a minimum bearing surface offset radially outward, i.e. asymmetrically, remains between nut body and washer. This leads to unfavorable transmission of force between washer and nut body. In addition, there is the risk of the bead margin of the retaining collar jamming on the step of the washer. In the case of a flanged nut, the retaining collar can be produced only with a considerable tool cost.

SUMMARY OF THE INVENTION

The object of the invention therefore consists in providing a fastening element, a washer and a fastening means formed from these two parts, in which the radial extent and the thickness of the washer are no longer limited.

The solution consists in a fastening element having the features of claim 1, a washer having the features of claim 5 and a fastening means formed from these two parts. According to the invention, provision is therefore made for the fastening element to have an encircling undercut at the end facing its bearing surface. The undercut serves to accommodate at least two axially extending retaining tabs which are formed on the contact surface of the washer.

An essential advantage of the present invention consists in the fact that both the flange required hitherto on the fastening element and the retaining collar proposed in the prior art on the washer are unnecessary. This is accompanied by a substantially lower production cost and material consumption. In addition, the undercut in the fastening element is much easier to produce than, for example, the retaining collar on the washer or the flange on the fastening elements known in the prior art. The development of the fastening element according to the invention therefore does not involve an increased tool cost. The same applies to the retaining tabs provided on the washer, it being possible, for example, for these retaining tabs to be stamped in one piece with the washer and to then be bent upward out of the plane of the washer.

Furthermore, the bearing surface between nut body and washer is symmetrical and wider than in the prior art, which results in a more favorable transmission of force. In particular, the introduction of force is improved, and the pressure force is more uniformly distributed.

Furthermore, the fastening element according to the invention permits the production of any desired variants with additional form features, for example the attachment of locking elements to that end of the fastening element which is remote from the bearing surface.

Furthermore, the dimensions, such as thickness and outside diameter, of the washer according to the invention can be selected as desired and are no longer restricted by the dimensions of the fastening element. The thickness of the washer may therefore be varied as desired because the dimensioning of the retaining tabs provided according to the invention, in contrast to the dimensioning of the retaining claws known in the prior art, is likewise freely selectable and is independent of the thickness of the washer. The diameter of the washer may likewise be varied as desired, since the retaining tabs provided according to the invention, in contrast to the retaining claws known in the prior art, no longer have to be arranged on the outer periphery of the washer.

A further advantage of the present invention is provided for by the fact that the fastening element and the washer can now be processed separately; in particular, they can now be subjected separately to a surface coating. This avoids a situation in which the fastening means resulting from fastening element and washer is impaired during the processing. In particular, the individual parts can no longer stick together during the application of a surface coating, and the coating is not damaged. Furthermore, more uniform coating thicknesses are possible.

The fastening means according to the invention and consisting of a fastening element and a washer is distinguished by the fact that the washer is held on the fastening element in a rotatable and captive manner. The fastening means can be produced in a very simple manner by the washer being "clipped into" the fastening means without considerable outlay in terms of machines. The retaining tabs on the washer are held in the undercut provided in the fastening element and are at the same time rotatable in the encircling undercut.

The present invention is distinguished by an especially simple design which can be produced with little outlay in terms of machines and permits many possible variations with regard to its dimensions.

Advantageous developments follow from the subclaims.

According to a preferred configuration of the present invention, the undercut provided in the fastening element is designed to be trapezoidal in cross section. This geometrically simple configuration is easy to produce. In this case, the retaining tabs formed on the washer are preferably arranged so as to be inclined radially outward at an acute angle ($\alpha$). Retaining tabs designed in this way are likewise simple to produce and, like a pushbutton, can simply and easily be pressed or "clipped" into the undercut. The retaining tabs are loosely held in the undercut and are therefore freely rotatable inside the encircling undercut.

However, in a further expedient embodiment, the undercut may also be designed as an encircling undercut groove. The retaining tabs formed on the washer are then preferably arranged perpendicularly and have at their free end a respective bead which is directed radially outward and engages in the encircling groove after the retaining tabs have been pressed into the undercut. In this configuration, too, the retaining tabs are freely rotatable in the encircling groove.

In order to make it easier to press or "clip" the retaining tabs into the undercut, an encircling bevel may be provided between the undercut and the bearing surface of the fastening element according to the invention. For the same reason, the retaining tabs may be designed to be elastic in the radial direction and may likewise have a run-on bevel.

Three or four retaining tabs are preferably provided on the washer in order to ensure even better retention. The retaining tabs may be arranged on a circular line at an equal angular distance. The thickness of the retaining tabs may be selected independently of the thickness of the washer. In particular, the retaining tabs may be thinner than the washer, a factor which simplifies in particular an elastic configuration.

There is also the fact that the washer according to the invention may be designed to be slightly arched like a disk spring. The arching is then directed toward the bearing surface of the fastening element. The advantage consists in the fact that the washer, during every phase of the fastening operation, i.e. when the fastening element is being screwed into place and tightened on a screw bolt, always stays on the surface of the adjacent component to be fastened irrespective of the magnitude of the forces acting in the process. Furthermore, a right angle (90°) can be set between retaining tabs and washer during the production of the washer. If the washer is slightly arched like a disk spring, the retaining tabs form an acute angle with the perpendicular, but maintain the right angle to the washer. This leads to a further improved force distribution between washer and nut body.

At the start of the fastening operation, a distinction is to be made between two friction radii of different size. The first, smaller friction radius is defined by the diameter of the bearing region of the fastening element on the washer. The second, larger friction radius is defined by the diameter of the effective friction area of the washer on the component. Since the effective friction torque is proportional to the friction radius, the friction torque between washer and component is greater than the friction torque between fastening element and washer. It follows from this that the washer, even at the start of the fastening operation and also during its continuation, remains stationary and does not rotate with the fastening element. This effect is intensified by the washer being arched slightly inward, so that it rests only with its outer margin on the component.

BRIEF DESCRIPTION OF THE DRAWINGS

Exemplary embodiments of the present invention are described in more detail below with reference to the attached drawings, in which:

FIG. 1 shows a partly sectioned side view of a first exemplary embodiment of a fastening means according to the invention in a schematic illustration not to scale;

FIG. 2 shows a partly schematic side view of a washer according to FIG. 1 in a schematic illustration not to scale;

FIG. 3 shows the washer from FIG. 2 in a plan view in a schematic illustration not to scale;

DETAILED DESCRIPTION OF PREFERRED EMBODIMENTS

Figure 4:
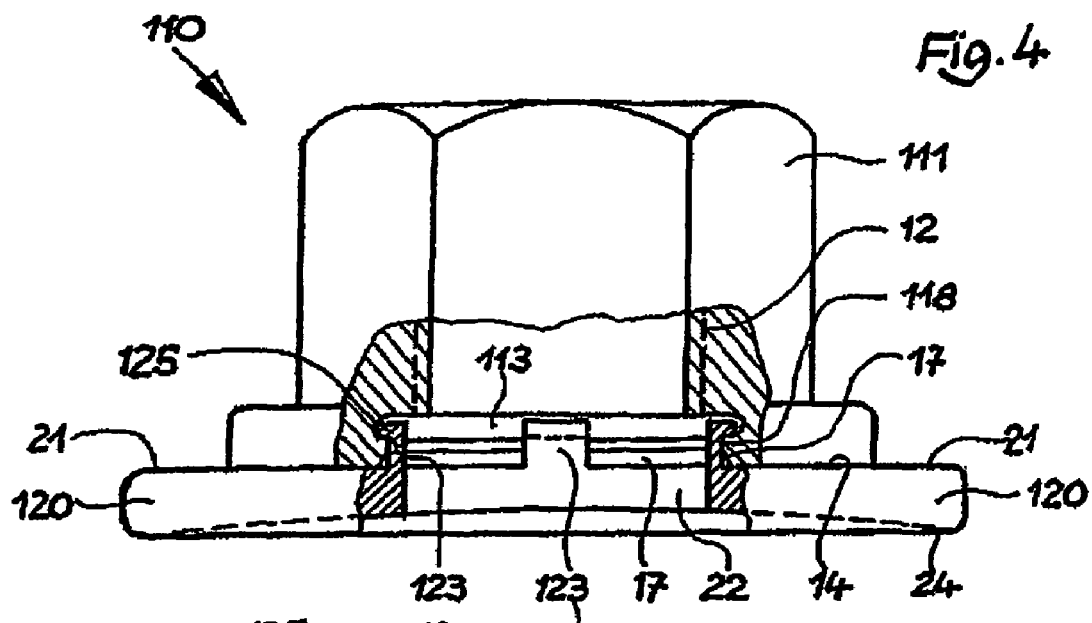
FIG. 4 shows a partly sectioned side view of a further exemplary embodiment of a fastening means according to the invention in a schematic illustration not to scale.

The fastening means 10 shown in FIG. 1 consists of a fastening element 11, designed as a nut body, and of a washer 20. The fastening element 11 has a central internal thread 12. The internal thread 12 ends at an undercut 13 which is designed to be roughly trapezoidal in cross section. The undercut 13 is defined by a bearing surface 14 which is formed by the end face of the fastening element 11.

The bearing surface 14 of the fastening element 11 is in contact with a contact surface 21 which forms the top side of the washer 20 (cf. also FIGS. 2 and 3). The washer 20 has a through-opening 22 adapted to the diameter of the internal thread 12 of the fastening element 11. Furthermore, axially extending retaining tabs 23 (four in the exemplary embodiment) are formed on the contact surface 21 of the washer 20. The retaining tabs 23 are inclined radially outward at an acute angle $\alpha$. The angle of the side wall 15 of the undercut 13 in the fastening element 11 is adapted to the angle $\alpha$. In the exemplary embodiment, the retaining tabs 23 are designed to be thinner than the thickness of the washer 20. This produces an elastic behavior of the retaining tabs 23 in the radial direction.

In the exemplary embodiment, the washer 20 is designed like a disk spring by virtue of the fact that it is arched by about 5°. In this case, the arching points in the direction of the bearing surface 14 of the fastening element 11. As a result, the underside 24 of the washer 20 first of all bears only at its outer margin on the component to be fastened.

To assemble a fastening means 10 consisting of a fastening element 11 and a washer 20, the retaining tabs 23 are pressed or "clipped" into the undercut 13 under axial pressure. In the process, an elastic configuration of the retaining tabs 23 makes it easier to overcome the edge 16 between bearing surface 14 and undercut 13. Further facilitation can be achieved by providing an encircling bevel 17 on the edge 16.

The washer 20 pressed into the undercut 13 of the fastening element 11 is held in said undercut 13 in a freely rotatable and captive manner.

The fastening means 110 shown in FIG. 4 is similar to the fastening means 10 already described. The same features are therefore provided with the same reference numerals below.

The fastening means 110 likewise consists of a fastening element 111, designed as a nut body, and of a washer 120. The fastening element 111 has a central internal thread 12. The internal thread 12 now ends in an undercut encircling groove 113. The groove 113 is defined by a perpendicularly running nose 118 which leads into the bearing surface 14 formed by the end face of the fastening element 111.

Figure 5:
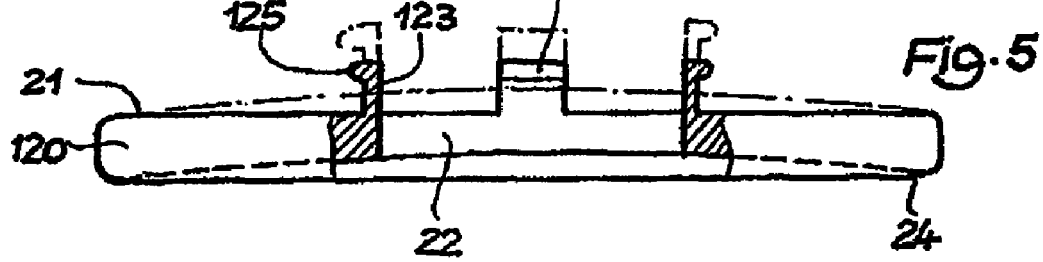
FIG. 5 shows a partly sectioned side view of the washer according to FIG. 4 in a schematic illustration not to scale.
Figure 6:
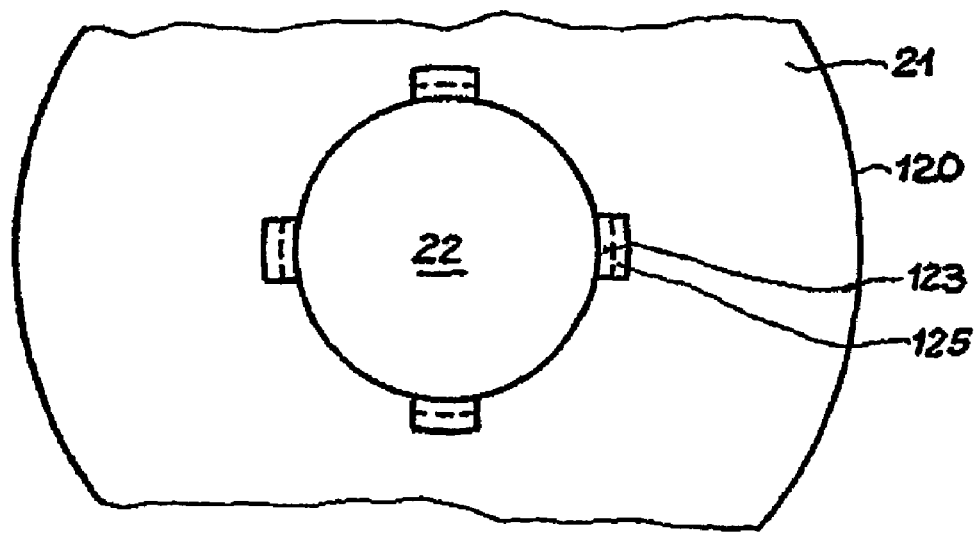
FIG. 6 shows the washer from FIG. 5 in a plan view in a schematic illustration not to scale.

The bearing surface 14 of the fastening element 111 is in contact with a contact surface 21 which forms the top side of the washer 120 (cf. also FIGS. 5 and 6). The washer 120 has a through-opening 22 adapted to the diameter of the internal thread 12 of the fastening element 111. Furthermore, axially extending retaining tabs 123 (four in the exemplary embodiment) are formed on the contact surface 21 of the washer 120. The retaining tabs 123 are disposed perpendicularly on the contact surface 21 of the washer 120. In the exemplary embodiment, the retaining tabs 123 are likewise designed to be thinner than the thickness of the washer 120, a factor which likewise produces an elastic behavior of the retaining tabs 123 in the radial direction. A bead 125 directed radially outward is formed on the free end of each retaining tab 123.

In this exemplary embodiment, the washer 20 is designed like a disk spring by virtue of the fact that it is arched by about 2° to 5°. In this case, the arching points in the direction of the bearing surface 14 of the fastening element 111. As a result, the underside 24 of the washer 120 first of all bears only at its outer margin on the component to be fastened.

To assemble a fastening means 110 consisting of a fastening element 111 and a washer 120, the beads 125 of the retaining tabs 123 are pressed or "clipped" into the encircling groove 113 under axial pressure. In the process, an elastic configuration of the retaining tabs 123 makes it easier to overcome the edge 16 between bearing surface 14 and nose 118. Further facilitation can be achieved by providing an encircling bevel 17 on the edge 16.

The washer 120 pressed into the encircling groove 113 of the fastening element 111 is held in said groove 113 in a freely rotatable and captive manner.

The invention claimed is:

1. A fastening means comprising a fastening element and a washer, the fastening element having at one end a bearing surface for said washer held in the fastening element in a rotatable and captive manner, the fastening element having an encircling undercut at the end facing said washer, the washer having a contact surface for the bearing surface of said fastening element, wherein at least two axially extending retaining tabs are formed on the contact surface, the retaining tabs being designed to be elastic in the radial direction, the washer being held on the fastening element in a rotatable and captive manner by said retaining tabs, wherein said retaining tabs and said washer have respective thicknesses and wherein the thickness of the retaining tabs is less than the thickness of said washer.

2. The fastening means as claimed in claim 1, wherein the undercut is designed to be trapezoidal in cross section.

3. The fastening means as claimed in claim 2, wherein an encircling bevel is provided between the undercut and the bearing surface.

4. The fastening means as claimed in claim 1, wherein the undercut is designed as an encircling undercut groove.

5. The fastening means as claimed in claim 1, wherein the retaining tabs are arranged so as to be inclined radially outward at an acute angle.

6. The fastening means as claimed in claim 1, wherein the retaining tabs are arranged perpendicularly and have at their free end a respective bead directed radially outward.

7. The fastening means as claimed in claim 1, wherein three or four retaining tabs are provided.

8. The fastening means as claimed in claim 1, wherein the edges of the retaining tabs which face the undercut are each provided with a bevel.

9. The fastening means as claimed in claim 1, wherein the washer is slightly arched in the form of a disk-spring.

* * * * *